United States Patent Office 2,734,045
Patented Feb. 7, 1956

2,734,045

CURING OF CHAIN EXTENDED POLYALKYLENE ETHER-POLYURETHANE POLYMER WITH HALOGEN COMPOUNDS

Jerry A. Nelson, Newark, Del., assignor to E. I. du Pont de Nemours and Company, Wilmington, Del., a corporation of Delaware No Drawing. Application March 30, 1954,
Serial No. 419,935

9 Claims. (Cl. 260—77.5)

This invention relates to the vulcanization or curing of the type of condensation polymers obtainable by the reaction of polyalkylene ether glycols with organic diisocyanates and water or other extender by mixing the polymer obtained with certain di- or polybrom- or chlor-compounds and certain metal oxides or hydroxides and subsequently heating the mass in a mold to effect curing. In copending application, Serial No. 365,270, filed June 30, 1953, by Hill, and its parent applications, there are disclosed reaction products of certain polyalkylene ether glycols and organic diisocyanates. These polymers contain alternating groups in which the glycol nucleus and diisocyanate nucleus are linked together with urethane groups in the following manner:

wherein O—G—O is a bivalent radical resulting from removal of the terminal hydrogen atoms from a polyalkylene ether glycol and R is the nucleus of the organic diisocyanate and $n$ is a small integer. Water or other extender is then added to the reaction mass and reacts with the free terminal —NCO groups to effect an increase in molecular weight by coupling together the prepolymers. The reaction between the terminal —NCO groups of two prepolymers may be presented as follows:

Thus, 1 molecule of water unites 2 prepolymer groups to effectively double the molecular weight. Additional reaction between the remaining 2 new terminal —NCO groups with water and other prepolymer molecules continues the buildup of the polymer. The $$-\overset{H}{\underset{|}{N}}-$$

groups in the resulting polymer serve as potential crosslinking sites for subsequent curing reactions.

When the prepolymer is reacted with chain extending agents other than water, the resulting uncured plastic polymer may contain functional groupings other than urea which is formed as indicated above. The chain extending agents are organic compounds containing two substituent groups each bearing active hydrogen in the form of —OH, —SH, —NH—, and —NH₂. Organic compounds suitable for chain extending agents may be alkylene, arylene, or cycloalkylene or any combination thereof. The reaction of isocyanates with active hydrogen containing groups present in various typical chain extending agents are described in the literature as proceeding as follows:

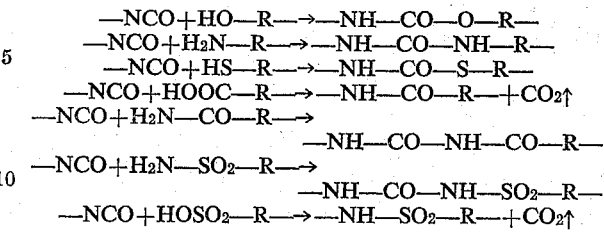

After reaction of the chain extending agents with the isocyanate-terminated prepolymer, the resulting polymeric product is a polyalkylene ether-polyurethane polymer, being comprised essentially of structural units having the formula

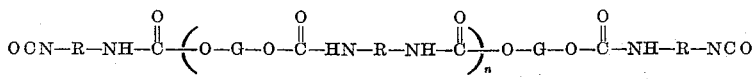

wherein O—G—O is a bivalent radical resulting from removal of the terminal hydrogen atoms from a polyalkylene ether glycol; R is a bivalent organic radical, said radical being inert to isocyanate groups; Q is a radical selected from the group consisting of a carbonyl radical and a non-polymeric diacyl radical; $n$ is an integer greater than zero; and $m$ is an integer including zero; each of the said structural units being connected to the next by a radical Q, having the significance defined above.

Alternatively, the condensation polymers may be prepared by the method of Carter and Ernsberger, application Serial No. 388,454, filed June 30, 1953. In this method a polyalkylene ether glycol is treated with an excess of phosgene to form a bischloroformate of the following general formula ClCOO(R—O)COCl where R represents the nucleus of a polyalkylene ether glycol. This bischloroformate is then mixed with phosgene and reacted with a diamine. The resultant product contains the nuclei of the polyalkylene ether glycol and the diamine and urethane and urea linkages, the bischloroformate giving urethane links on reacting with an —NH₂ group and the phosgene giving urea links on reacting with two —NH₂ groups.

Organic diisocyanates have been used to vulcanize these products. The diisocyanates are quite reactive, and under some conditions tend to cause the polymer to "scorch" or precure on the rubber mill before the product can be placed in a mold for curing. The diisocyanates are expensive and some are rather toxic, and therefore, present serious difficulties when curing elastomers on a commercial scale.

It is an object of the present invention to provide curing agents for such polymers which are organic compounds, other than diisocyanates, and which have at least two groups which will react with either the urethane or urea hydrogens of the polymer and thus, form a bridge or cross-link between the two linear polymers. Another object is the provision of agents which cure or vulcanize the above polymers to form a cured elastomer. A still further object is the provision of a method by which elastomers having outstanding properties may be cured by a relatively economical and simple process. Other objects will be apparent as the description of the invention proceeds.

These and other objects are accomplished by mixing (A) a condensation polymer of the type described above; (B) 1–10 parts per 100 parts of polymer of an organic compound having at least two active chlorine or bromine atoms and containing no other reactive groups, such compounds being (1) organic polycarboxylic acid chlorides or bromides or organic polysulfonic acid chlorides or bromides, or (2) organic compounds wherein the chlorine or bromine atoms are each attached to carbon atoms which are adjacent to a carbon atom doubly bonded to another atom, such as polyhalo carboacyclic compounds and polyhalo carbocyclic compounds; (c) from 1–10 parts per 100 parts of polymer of an acid acceptor from the group consisting of the oxides and hydroxides of magnesium, calcium, strontium and barium, and the oxides of zinc, lead and antimony, the amount by weight of the acid acceptor being at least about one-half the weight of the brom- or chlor-compound; and subsequently, curing the mixture by heating to about 80° to 150° C.

For the purpose of this invention, the term active hydrogen is used to mean a hydrogen atom which reacts with methyl magnesium iodide in the Zerewitinoff method (Kohler—J. Am. Chem. Soc. 49, 3181 (1927)).

The process may be carried out in conventional rubber processing apparatus, such as a rubber mill. The polyalkylene ether glycol-diisocyanate condensation polymer is milled to a smooth band and then the brom- or chlor-compound and the acid acceptor added during the milling step, which is continued until the mass is homogeneous. The compounded stock is then placed in a mold and cured by heating, usually under pressure.

The curing temperature is preferably between 100° and 150° C. For some purposes, the temperature may be maintained as low as 80° C. but reaction is slow, and below this temperature, it is usually too slow to be commercially feasible. At temperatures above 150° C. there is a tendency toward the formation of gas pockets in the product. The amount of pressure used depends upon the nature of the mold, usually only sufficient is necessary to cause the polymer to flow and fill the mold and for this purpose, pressures of from 50 to 1000 pounds per square inch are normally used. Under exceptional conditions, higher pressures are operative and for sheet material or other forms which do not require a mold, curing may be effected without pressure.

Among the brom- and chlor-compounds which may be used in the invention, the following compounds are typical:

Adipoyl chloride
Terephthaloyl chloride
Cyclohexyl-1,4-disulfonyl chloride
Naphthylene-1,5-disulfonyl chloride
Ethyl-$\alpha,\alpha'$-dibromoadipate
Sebacyl bromide
Dichloroacetone
Tetrachlorobenzoquinone
Dibromobenzoquinone
Dichlorodiacetyl
1,4-dibromobutene-2
1,4-dichlorobutene-2
1,4-di(chloromethyl) benzene
1,4-di(bromomethyl) benzene If less than 1 part of brom-or chlor-compound per 100 parts of polymer is used, there is an insufficient amount to effect a useful cure. On the other hand, more than 10 parts per 100 parts of polymer is undesirable because unreacted brom- or chlor-compound may be left in the elastomer in which case it acts as an undesirable diluent and may ultimately cause deterioration of the product by gradual liberation of acid.

It is preferable that the brom- or chlor-compound be ground rather finely, if it is solid, so as to facilitate incorporation into the polymers and not to leave large discrete particles of unreacted material in the product. In general, the compound should be ground fine enough to pass thru a 100 mesh screen. Generally coarser compounds will be subjected to mechanical breakdown on the mill and will ultimately become small enough to be effective. This, however, unduly uses valuable mill time and is thus, not preferred.

The acid acceptor also acts in a specific manner and appears to play an important but not wholly explainable part in the invention in addition to its role as an acid acceptor for the acid formed as a by-product when the brom- or chlor-compounds react with the

of the urea or urethane.

It has been further found that while the oxides and hydroxides mentioned above are satisfactory, related metal oxides which form weak bases in water are inoperative. Among these may be mentioned $Fe_2O_3$, $CuO$, and $SnO$.

The acid acceptor must be present in excess of the stoichiometric amount necessary to react with the HCl or HBr liberated in the reaction. In this connection it has been found that as a rule the ratio of acid acceptor to brom- or chlor-compound should not be less than about 1 part of acid acceptor for each 2 parts of brom- or chlor-compound. An excess of the acid acceptor does no harm but may act as a filler or compounding ingredient. However, normally, more than 10 parts by weight per 100 parts of polymer is not necessary. The oxide or hydroxide should be finely ground so that it may be readily dispersed in the polymer. Preferably it is passed through a 100 mesh screen to insure uniform fineness. In addition to these oxides or hydroxides other conventional compounding agents, such as carbon black, silica, whiting, color materials, plasticizers, antioxidants and stabilizers may be added.

Among the polymers which may be cured by the herein disclosed process are those prepared by reacting polyalkylene ether glycols with organic diisocyanates and water or a compound having two groups containing active hydrogen, such as —OH, —NH$_2$, —COOH, —CONH$_2$, —SO$_2$NH$_2$, etc. Typical polyalkylene ether glycols are those of molecular weight of at least 750 and up to 10,000–12,000 and having the general formula HO(—R$_1$—O—RO)$_n$H where R$_1$ and R are alkylene groups, the same or different, and $n$ is an integer. The polyalkylene ether glycols disclosed in Hill, Serial No. 365,270, filed June 30, 1953, and its parent cases, are typical.

Either aromatic or aliphatic diisocyanates may be used. The following are illustrative of usable types:

2,4-tolylene diisocyanate
Hexamethylene diisocyanate
Methylene bis-(4-phenyl isocyanate)
4,4'-biphenylene diisocyanate
Naphthylene-1,5-diisocyanate
Cyclohexane-1,4-diisocyanate
Decamethylene-1,10-diisocyanate Instead of water as the secondary reactant (which may be considered a reactant to increase the molecular weight by coupling or extending the polymer chains) there may be used such difunctional compounds as:

Ethylene glycol
Propylene glycol
Adipic acid
Sebacic acid
Succinamide
Cyclohexene-1,4-disulfonamide
Monoethanolamine
2,4-tolylenediamine
Hexamethylenediamine
Glycolic-acid The polyalkylene ether glycol may be first reacted with the diisocyanate and then with the extender or all the reactants may be present simultaneously. Two or more extenders may be used together to modify the properties of the cured elastomer. In any case, enough of the polyalkylene ether glycol reactant should be incorporated into the reaction product so that the polyether residues resulting from it comprise at least 35% of the total weight of the product to be cured according to the process of the present invention.

If the ratio of the number of isocyanate groups present to the total number of active hydrogen containing groups (water is assumed to have two such groups) is greater than about 1:1 there will be free —NCO groups on the polymer. In such cases, the polymer will tend to cure slowly. In order to avoid this, it is preferable to add to the polymer a basic nitrogen compound having at least one replaceable hydrogen atom to stabilize it. If the ratio is less than 1:1, there will be no free —NCO groups and the polymer will not tend to precure. In general, the ratio of —NCO groups to active hydrogen containing groups will be between about 12:1 and about 0.8:1.

The following examples are given by way of illustration but no limitation is placed thereon since it will be apparent that any of the above brom- or chlor-compounds may be substituted for those given and any of the metal oxides or hydroxides mentioned above may likewise be substituted in the examples or used with any brom- or chlor-compound within the ratios given above. Unless otherwise noted, the parts are by weight.

The following examples were all carried out by the same general procedure. A rubber mill was used to mill the polyalkylene ether glycol-arylene diisocyanate-water condensation polymer into a smooth band, and then the brom- or chlor-compound and the metal oxide were added and milled in at the same temperature. The compounded polymer was then removed from the mill and placed in a mold to form a ring or slab. This was then cured for 15 to 120 minutes at a temperature of 100° to 135° C. in a press.

The condensation polymers used for the curing experiments were all prepared in the same general manner. The polyalkylene ether glycol was put in a Werner-Pfleiderer type mill which was heated until the polyglycol melted and then the mill was started and the mass heated to about 100° C. Two to three mols of an arylene diisocyanate was then added for each mol of polyglycol and milling was continued for about 30 to 60 minutes. There was then added approximately one and one-half mols of water per mol of polyglycol and milling was continued. The reaction mass gradually transformed into rubbery chunks. These were transferred to a rubber mill and sheeted out and an amine with at least one free hydrogen was added in the approximate proportion of 1 to 2 parts per 100 parts of product to stabilize the condensation polymer and prevent precuring of the product as disclosed in the copending application of Nelson et al., Serial No. 379,291.

The properties of the cured elastomers were determined at 25° C. in water and unless otherwise stated the elastomers have a general similarity. They are transparent or translucent and with a light to dark amber color, and are quite elastic and resilient. They are resistant to the action of solvents.

*Examples I–VI*

The polymer was made from the following ingredients by the above described procedure:

Polytetramethylene ether glycol (M. W. 2830) _____mols__ 1.0
2,4-tolylene diisocyanate_____do____ 2.14
Water _____do____ 1.46
Piperidine _____ 0.75 pt./100 pts. product This product was milled to a smooth band and then 2,4-di(chlormethyl) anisole and the indicated metal oxide were milled in. The compounded stock was then put in a mold and cured under pressure at the temperature and time shown.

| | 2,4-di-(chlormethyl) anisole, Pts./100 | Metal Oxide, Pts./100 | Cure, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 1 | 4 | MgO, 4 | 30/134 | 625 | 1,250 | 380 |
| 2 | 4 | PbO, 8 | 30/134 | 625 | 909 | 340 |
| 3 | 4 | Sb₂O₃, 6 | 30/134 | 625 | 682 | 310 |
| 4 | 4 | CaO, 4 | 30/134 | 511 | 1,020 | 410 |
| 5 | 4 | BaO, 8 | 30/134 | 510 | 625 | 320 |
| 6 | 4 | ZnO, 4 | 30/134 | | 700 | 230 |

A control run without the chlor-compound or oxide showed no cure under the same conditions of time, temperature and pressure.

*Example VII*

One hundred (100) parts of the same polymer as in Examples I to VI was milled with 6.8 parts of 1,4-di(chlormethyl) benzene and 8 parts of MgO and cured for 120 minutes at 134° C. under pressure. The elastomer so obtained had the following properties.

Modulus at 300% elongation_____lbs./sq. in__ 341
Tensile strength at the break_____lbs./sq. in__ 1250
Elongation at the break_____percent__ 540

*Examples VIII–XI*

A polymer was made from a polyethylene ether glycol of an average molecular weight of 1000 as in the above general procedure.

Parts
Polyethylene ether glycol_____ 105
2,4-tolylene diisocyanate_____ 54.8
Benzene sulfonyl chloride_____ 0.26
Water _____ 0.345

After heating and mixing for 1 hour at 80° to 100° C., there was added with continued milling:

Parts
Water _____ 6.94
Pyridine _____ 0.83

When the mass began to pull free from the sides of the mill, there was added 3.2 parts of 2-amino-6-methyl pyridine as a stablizing agent and milling was continued until the mass formed crumbs which could be removed from the mill. This stabilized product was sheeted out on a rubber mill and 2,4-di(chlormethyl) anisole and magnesium oxide milled in and the products cured as shown in the following table:

| | 2,4-di-(chlormethyl) anisole, Pts./100 | Magnesium Oxide, Pts./100 | Curing, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 8 | 2 | MgO, 1 | 30/134 | 620 | 1,000 | 400 |
| 9 | 4 | MgO, 2 | 30/134 | 880 | 1,300 | 360 |
| 10 | 8 | MgO, 4 | 15/134 | | 1,140 | 220 |
| 11 | 8 | MgO, 8 | 15/134 | | 1,700 | 240 |

Examples XII and XIII

These examples were based on a polymer prepared as follows:

1050 parts polyethylene ether glycol, aver. mol. wt. 1000
3.45 parts water
548 parts 2,4-tolylene and diisocyanate
2.6 parts benzene sulfonyl chloride were milled together for 1 hour at 80° to 100° C. There were then added:

69.4 parts water
8.3 parts pyridine and milling was continued 80° to 100° C. until the product formed crumbs. It was then placed on a warm rubber mill and 4 parts of piperidine, as a stabilizer, were added per 100 parts of polymer.

Portions of this stabilized product were then compounded with 2,4-di(chlormethyl) anisole as before. The compounded stock was cured as shown below:

| | 2,4-di-(chlor-methyl) anisole, Pts./100 | Magnesium Oxide, Pts./100 | Cure, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 12 | 8 | 8 | 15/134 | | 1,140 | 170 |
| 13 | 4 | 4 | 15/134 | 940 | 1,280 | 400 |

A control sample to which no agents were added showed no cure. Similarly a sample to which only 8 parts of MgO were added showed no cure. A sample to which only 8 parts of 2,4-di(chlormethyl) anisole were added showed some cure but the sample was so badly blown by trapped HCl that is could not be tested.

Example XIV 100 parts of the stabilized polymer of Examples I–VI was milled to a smooth band and 4 parts of terephthaloyl chloride and 4 parts of MgO were milled in. The product was cured for 30 minutes at 134° C. under pressure. The elastomer had the following properties:

Tensile strength at the break_____lbs./sq. in__ 1350
Modulus at 300% elongation_____lbs./sq. in__ 312
Elongation at the break_____ percent__ 650

Example XV 100 parts of the polymer of Examples I–VI was milled to a smooth band on a rubber mill and 3.5 parts of the adipoyl chloride and 6 parts of MgO were milled in. The product was cured for 30 minutes at 134° C. under pressure. A smooth slab of elastomer was obtained with the following properties when tested in air at 25° to 30° C.:

Tensile strength at the break_____lbs./sq. in__ 2050
Modulus at 300% elongation_____lbs./sq. in__ 700
Elongation at the break_____ percent__ 650

Examples XVI–XVIII

The polymer of Examples I–VI was used and it was compounded as before with cyclohexane-1,4-disulfonyl chloride and metal oxides with the results shown below:

| | Cyclo-hexane-1,4-di-sulfonyl chloride, Pts./100 | Metal Oxide, Pts./100 | Cure, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 16 | 4 | MgO, 4 | 30/134 | 340 | 2,715 | 670 |
| 17 | 4 | MgO, 8 | 30/134 | 340 | 2,600 | 720 |
| 18 | 4 | ZnO, 4 | 30/134 | 228 | 1,025 | 780 |

Example XIX 100 parts of the polymer of Examples I–VI was milled on a rubber mill with 4 parts of naphthalene-1,5-disulfonyl chloride and 4 parts of MgO and then cured at 134° C. for 30 minutes under pressure. The resulting rubbery elastomer had the following properties:

Tensile strength at the break_____lbs./sq. in__ 2953
Modulus at 300% elongation_____lbs./sq. in__ 364
Elongation at the break_____ percent__ 690

Examples XX–XXII

A polymer was prepared by the general procedure from the following ingredients:

Polytetramethylene ether glycol (M. W. 2900) mols__ 1
2,4-tolylene diisocyanate _____ do__ 2.3
Water _____ do__ 1.55

The polymer was then stabilized by milling in 1.03 parts of piperidine per 100 parts of polymer. The stabilized polymer was then milled with cyclohexane-1,4-disulfonyl chloride and MgO and cured as shown below:

| | Cyclo-hexane-1,4-di-sulfonyl chloride, Pts./100 | MgO, Pts./100 | Cure, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 20 | 10 | 10 | 30/134 | 227 | 2,050 | 800 |
| 21 | 4 | 4 | 30/134 | 227 | 2,330 | 770 |
| 22 | 1 | 2 | 30/134 | 227 | 1,400 | 830 |

Examples XXIII–XXV

The polymer of Examples I–VI was milled with cyanuric chloride and metal oxides and then cured as shown below:

| | Cyanuric chloride, Pts./100 | Metal Oxide, Pts./100 | Cure, Min./° C. | Properties of Cured Elastomer | | |
|---|---|---|---|---|---|---|
| | | | | Modulus at 300% Elong., Lbs./Sq. In. | Tensile At Break, Lbs./Sq. In. | Elong. At Break, Percent |
| 23 | 4 | MgO, 4 | 30/134 | 313 | 3,000 | 750 |
| 24 | 4 | BaO, 4 | 30/134 | 312 | 1,700 | 620 |
| 25 | 4 | ZnO, 4 | 30/134 | 284 | 1,500 | 590 |

A control sample to which nothing was added showed no curing under the same conditions of temperature and time.

Examples XXVI–XXXIII

A polymer was prepared by the general procedure outlined above from the following:

Polytetramethylene ether glycol (M. W. 2900) mols__ 1
2,4-tolylene diisocyanate _____ do__ 2.3
Water _____ do__ 1.54

The polymer was then milled with 0.77 part of piperidine per 100 parts of polymer to stabilize it. The stabilized polymer was then milled with tetrachlorobenzoquinone,

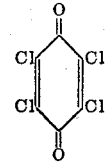

and magnesium oxide and cured as below:

| Tetra-chloro-benzo-quinone, Pts./100 | MgO, Pts./100 | Cure, Min./ °C. | Properties of Cured Elastomer | | |
|---|---|---|---|---|---|
| | | | Modulus at 300% Elong., Lbs./Sq. In. | Tensile At Break, Lbs./Sq. In. | Elong. At Break, Percent |
| 26 | 1 | 4 | 30/134 | 426 | 3,980 | 720 |
| 27 | 2 | 4 | 30/134 | 455 | 3,060 | 620 |
| 28 | 4 | 4 | 30/134 | 455 | 3,440 | 620 |
| 29 | 8 | 4 | 30/134 | 450 | 4,280 | 630 |
| 30 | 4 | 2 | 30/134 | 510 | 2,280 | 600 |
| 31 | 4 | 8 | 30/134 | 397 | 3,060 | 650 |
| 32 | 4 | 4 | 60/100 | 340 | 4,100 | 650 |
| 33 | 10 | 10 | 30/134 | 600 | 4,150 | 590 |

Under similar conditions, the use of benzoquinone instead of the tetrachlorobenzoquinone did not give any cure or vulcanizing effect.

*Example XXXIV*

100 parts of the polymer of the preceding Examples XXVI–XXXIII was milled with 6 parts of tetrachlorobenzoquinone and 4 parts of MgO and 30 parts of carbon black. It was then cured by heating in a mold under pressure at 134° C. for 30 minutes. The elastomer had the following properties:

Tensile at the break _____ Greater than 4800 lbs./sq. in.
Modulus at 300% elongation. 3000 lbs./sq. in.
Elongation at the break ___ Greater than 400%.

Comparison with Examples XXVI–XXXIII shows that carbon black effectively increases the tensile strength of the product and gives an increased modulus.

*Example XXXV*

One molar proportion of polytetramethylene ether glycol of average molecular weight 2150 was placed in a Werner-Pfleiderer mixer and heated to 80° to 85° C. at which temperature the glycol is liquid. There was then added 2.3 molar proportions of 2,4-tolylene diisocyanate, the mill was closed and an atmosphere of nitrogen maintained in the mixer. The charge was heated to 110° to 120° C. and milled for 2 hours after which it was cooled slightly and 1.42 molar proportions of succinic acid added and milling continued 3.5 hours at 110° to 120° C. At the end of this time, the charge was a mass of rubbery chunks. The charge was then transferred to a rubber mill and milled to a smooth sheet, after which, for each 100 parts by weight of the polymer on the mill, 4 parts of adipoyl chloride and 5 parts of MgO were added and milling continued until thorough mixing was achieved. A part of the mass was then put in a mold and cured in a press at 105° C. for 16 hours under pressure. The resulting tough rubbery slab had the following properties at 25° C.

Tensile strength at the break _____ lbs./sq. in.__ 1895
Modulus at 300% elongation _____ lbs./sq. in.__ 684
Elongation at the break _____ per cent __ 600

*Example XXXVI*

A polymer was prepared by the general procedure from a polytetramethylene ether glycol of average molecular weight 2650.

Polytetramethylene ether glycol _____ mols __ 1.0
2,4-tolylene diisocyanate _____ do __ 2.3
Water _____ do __ 1.54
Piperidine _____ 0.76 pt./100 pts.

100 parts of this polymer was then milled to a sheet on a rubber mill and 4 parts of tetrachlorobenzoquinone and 4 parts of Mg(OH)$_2$ were thoroughly mixed in. A portion was then cured in a mold in a press at 80° C. for 12 hours. The elastomer had the following properties:

Tensile strength at the break _____ lbs./sq. in.__ 4000
Modulus at 300% elongation _____ lbs./sq. in.__ 320
Elongation at the break _____ per cent __ 660

*Example XXXVII*

The polymer was prepared in the same general manner as in the previous examples. The reactants were:

Polytetramethylene ether glycol (ave. mol. wt. 2700,
  acid no. nil., containing .37 mol H$_2$O) ____ mols __ 1
2,4-tolylene diisocyanate _____ do __ 2.1
Water _____ do __ 5.11
Piperidine _____ 0.49 part/100 parts of polymer The condensation of the polyether glycol and the diisocyanate was carried out at 70° to 75° C. over a period of 3 hours and the reaction with water required 30 minutes while the temperature was raised from 75° C. to 120° C.

To 20 parts of the stabilized elastomer was added 0.8 part of dibromodiacetyl and 0.8 part of magnesium oxide on a rubber mill and the mixture was milled until homogeneous. The compounded polymer was then cured in a mold at 134° C. under pressure for 30 minutes. The resulting elastomer showed the following properties:

Tensile strength at the break _____ lbs./sq. in.__ 4770
Modulus at 300% elongation _____ lbs./sq. in.__ 390
Elongation at the break _____ per cent __ 690

*Example XXXVIII*

The stabilized elastomer of Example XXXVII was compounded on a rubber mill with 4 parts of 2,5-dichloroquinone and 2 parts of magnesium oxide per 100 parts of polymer. It was then cured in a mold at 134° C. under pressure for 30 minutes. The resulting elastomer showed the following properties:

Tensile strength at the break _____ lbs./sq. in.__ 4090
Modulus at 300% elongation _____ lbs./sq. in.__ 340
Elongation at the break _____ percent __ 740

When an equal quantity of 1,4-dichlorobutene-2 was substituted for the 2,5-dichloroquinone in the above formulation, a cured elastomer was also obtained on heating at 134° C. under pressure for 30 minutes.

It is apparent that many widely different embodiments of this invention may be made without departing from the spirit and scope thereof, and therefore, it is not intended to be limited except as indicated in the appended claims.

I claim:

1. The process of curing a polymeric product, said product being comprised essentially of structural units having the formula

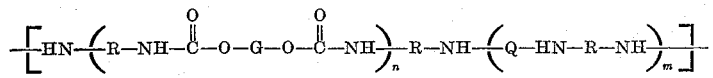

wherein O—G—O is a bivalent radical resulting from removal of the terminal hydrogen atoms from a polyalkylene ether glycol having a molecular weight of at least 750; R is a bivalent organic radical, said radical being inert to isocyanate groups; Q is a radical selected from the group consisting of a carbonyl radical and a non-polymeric diacyl radical, said diacyl radical being free from any intralinear unsaturation other than carbon to carbon unsaturation; n is an integer greater than zero; and m is an integer including zero; each of the said structural units being connected to the next by a radical Q, having the significance defined above; the overall ratio of the number of R to O—G—O radicals in the polymer being between 1.1:1 and 12:1; and at least 35% of the total weight of the polymer being the bivalent radicals O—G—O; which comprises milling the said polymer with (a) from 1 to 10 parts per 100 parts of polymer of an active halogen compound containing at least two active halogen atoms and having no other reactive groups, said active halogen compound being selected from the group consisting of (1) halogen substituted benzoquinones, (2) diacyl halides and (3) compounds containing two di(chloromethyl) groups, said di(chloromethyl) groups being attached to doubly bonded carbon atoms of an organic residue, said organic residue being selected from the group consisting of divalent unsaturated aliphatic hydrocarbon radicals, divalent aromatic hydrocarbon radicals and methoxy substituted divalent aromatic hydrocarbon radicals, and (b) from 1 to 10 parts per 100 parts of polymer of an acid acceptor selected from the group consisting of oxides and hydroxides of magnesium, calcium, strontium and barium and the oxides of zinc, lead and antimony, the amount by weight of acid acceptor being at least about one-half the weight of the active halogen compound; and subsequently curing the mixture by heating the same to a temperature of about 80 to 150° C.

2. A cured elastomer obtained by the process of claim 1.

3. The process of claim 1 wherein the bivalent radical, O—G—O, is obtained by removing the terminal hydrogen atoms from a polytetramethylene ether glycol having a molecular weight of from 750 to 3500.

4. The process of claim 3 wherein the bivalent organic radical, R, is a 2,4-tolylene radical.

5. The polymer of claim 4 wherein Q is a carbonyl radical.

6. The process of claim 1 wherein the active halogen compound is tetrachlorobenzoquinone.

7. The process of claim 1 wherein the active halogen compound is 2,4-di(chloromethyl)anisole.

8. The process of claim 1 wherein the active halogen compound is 1,4-di(bromomethyl)benzene.

9. The process of claim 1 wherein the acid acceptor is magnesium oxide.

References Cited in the file of this patent

UNITED STATES PATENTS

| | | |
|---|---|---|
| 2,561,814 | Novotny et al. | July 24, 1951 |
| 2,631,993 | Morgan | Mar. 17, 1953 |

FOREIGN PATENTS

| | | |
|---|---|---|
| 580,526 | Great Britain | Sept. 11, 1946 |